(12) United States Patent
Hisano et al.

(10) Patent No.: US 9,742,888 B1
(45) Date of Patent: Aug. 22, 2017

(54) ELECTRONIC DEVICE

(71) Applicant: KYOCERA Corporation, Kyoto-shi, Kyoto (JP)

(72) Inventors: Shuhei Hisano, Osaka (JP); Hiroyoshi Kawanishi, Sanda (JP); Hayato Mizuno, Osaka (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/272,355

(22) Filed: Sep. 21, 2016

(30) Foreign Application Priority Data

Apr. 26, 2016 (JP) .................................. 2016-087822
Jun. 24, 2016 (JP) .................................. 2016-125664

(51) Int. Cl.
| | |
|---|---|
| *H04M 1/00* | (2006.01) |
| *H04M 1/03* | (2006.01) |
| *H04M 1/18* | (2006.01) |
| *H04B 1/3888* | (2015.01) |
| *H04B 1/38* | (2015.01) |

(52) U.S. Cl.
CPC .......... *H04M 1/035* (2013.01); *H04B 1/3888* (2013.01); *H04M 1/18* (2013.01); *H04B 2001/3894* (2013.01)

(58) Field of Classification Search
CPC ................. H04M 1/035; H04B 1/3888; H04B 2001/3894
USPC ........... 455/575.1, 550.1, 90.3, 578.1, 575.8; 381/332; 361/752
See application file for complete search history.

(56) References Cited

U.S. PATENT DOCUMENTS

| | | | |
|---|---|---|---|
| 8,942,773 B2 * | 1/2015 | Wu ......................... | A45C 11/00 |
| | | | 206/320 |
| 2014/0087792 A1 * | 3/2014 | Park ....................... | H05K 5/061 |
| | | | 455/575.1 |
| 2014/0161293 A1 * | 6/2014 | Wang ..................... | H04R 1/021 |
| | | | 381/332 |
| 2015/0146361 A1 | 5/2015 | Kawanishi | |
| 2016/0020811 A1 | 1/2016 | Kawanishi | |
| 2016/0112553 A1 * | 4/2016 | Park ....................... | H04M 1/035 |
| | | | 455/575.1 |

FOREIGN PATENT DOCUMENTS

JP 2015-088813 A 5/2015

\* cited by examiner

*Primary Examiner* — Sonny Trinh
(74) *Attorney, Agent, or Firm* — Procopio Cory Hargreaves and Savitch LLP

(57) ABSTRACT

An electronic device includes a case, a panel which includes a first surface including a contour line and is held by the case such that the first surface faces outward, the contour line being provided with a first recess, a first component located in the case, and a cover which is provided with a through hole or a cut for communication between the first component and the outside and is located to hide the first recess when the first surface is two-dimensionally viewed.

14 Claims, 19 Drawing Sheets

ELECTRONIC DEVICE

CROSS-REFERENCE TO RELATED APPLICATION

The present application claims priority under 35 U.S.C. §119 to Japanese Patent Application No. 2016-087822 filed on Apr. 26, 2016, entitled "Electronic Device", and Japanese Patent Application No. 2016-125664 filed on Jun. 24, 2016, entitled "Electronic Device". The content of which is incorporated by reference herein in its entirety.

FIELD

The present disclosure relates to an electronic device.

BACKGROUND

Various techniques have been proposed for electronic devices.

SUMMARY

An electronic device based on the present disclosure includes a case, a panel, a first component, and a cover. The panel includes a first surface and a first recess. The panel is held by the case such that the first surface faces outward. The first component is located in the case. The cover includes a through hole or a cut for communication between the first component and the outside. The cover is located to hide the first recess.

The foregoing and other objects, features, aspects and advantages of the present disclosure will become more apparent from the following detailed description of the present disclosure when taken in conjunction with the accompanying drawings.

DETAILED DESCRIPTION

Figure 1:
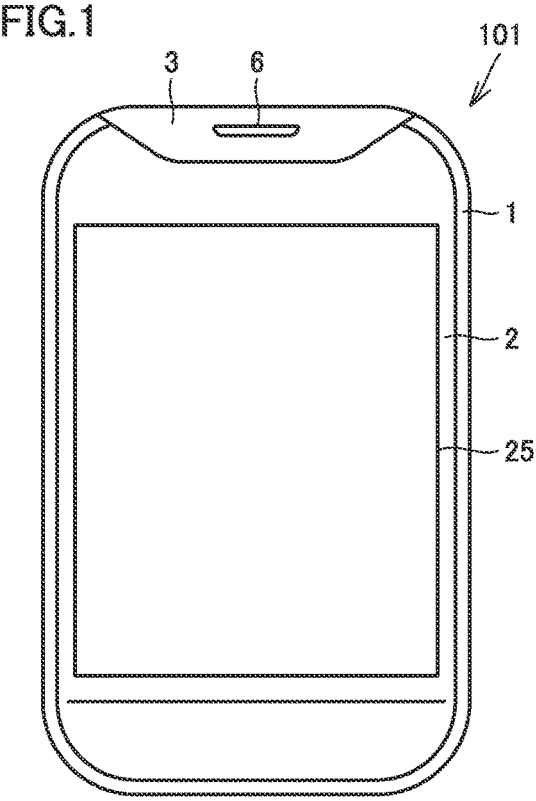
FIG. 1 is a plan view of an electronic device in a first embodiment based on the present disclosure.

A dimensional ratio shown in the drawings does not necessarily faithfully represent an actual dimensional ratio and a dimensional ratio may be exaggerated for the sake of convenience of description. A concept up or upper and down or lower mentioned in the description below does not mean absolute up or upper or down or lower but may mean relative up or upper or down or lower in terms of a shown position.

First Embodiment

An electronic device in a first embodiment based on the present disclosure will be described with reference to FIGS. 1 to 13.

FIG. 1 shows appearance of an electronic device 101 in the first embodiment. Electronic device 101 includes a case 1, a panel 2, and a cover 3 as shown in FIG. 1. Panel 2 may be transparent. A display panel may be located behind panel 2. The display panel may be, for example, any of a liquid crystal display panel, an organic EL display panel, and an inorganic EL display panel. At least a part of a surface of panel 2 may serve as a display area 25 as an image shown on the display panel is visually recognizable from the front through panel 2. In the example shown in FIG. 1, the surface of panel 2 includes rectangular display area 25. A touch panel may be located between panel 2 and the display panel. Electronic device 101 may include a button on a side surface. Electronic device 101 may include a button at any position in a surface in front in FIG. 1.

Figure 2:
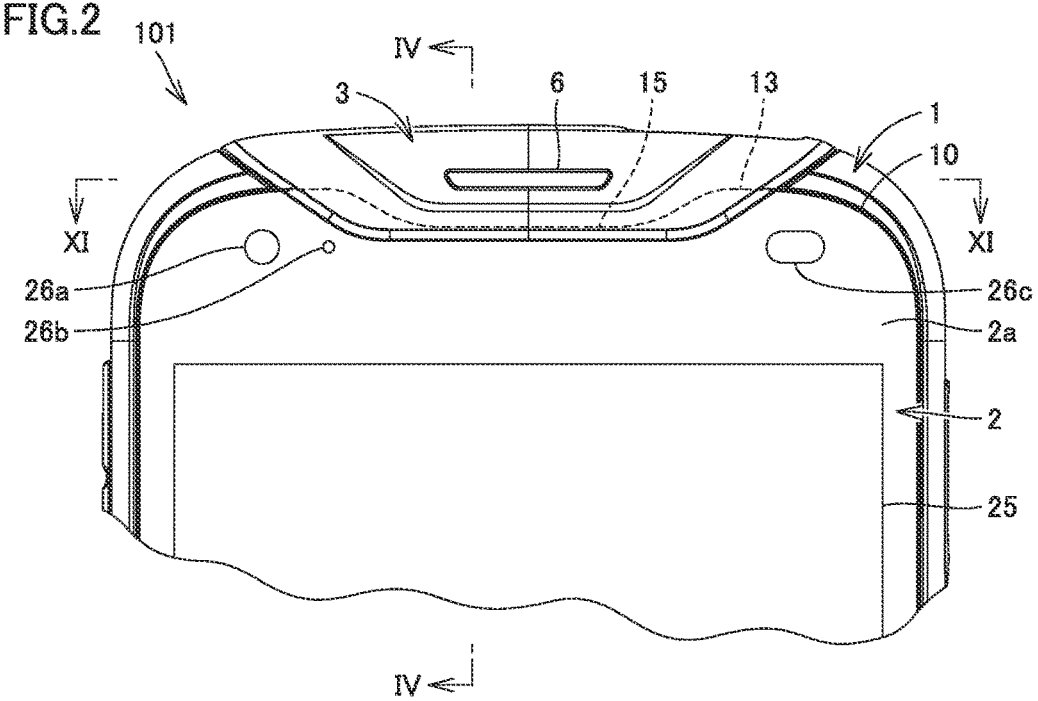
FIG. 2 is a partially enlarged plan view of the electronic device in the first embodiment based on the present disclosure.

FIG. 2 shows a portion in the vicinity of cover 3 as being enlarged, of electronic device 101 shown in FIG. 1.

Figure 3:
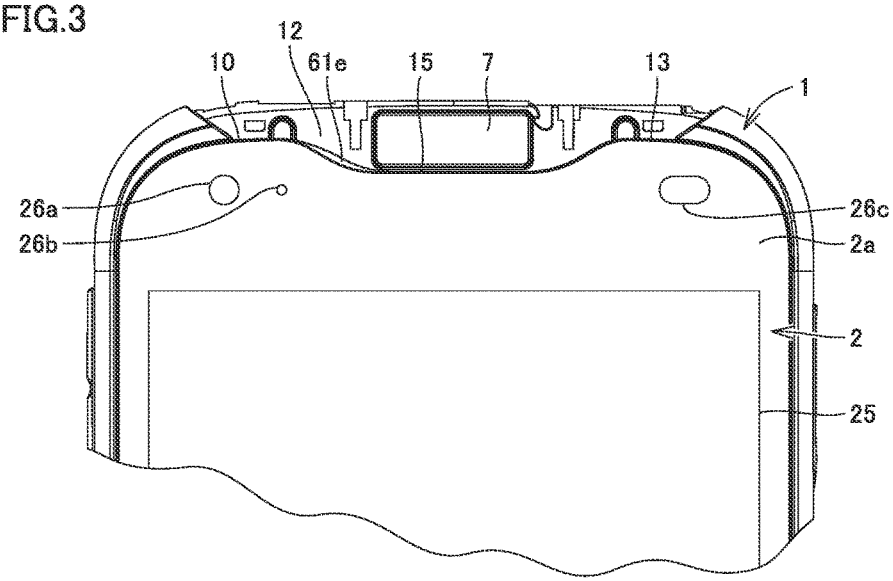
FIG. 3 is a partially enlarged plan view of the electronic device in the first embodiment based on the present disclosure, from which a cover has been removed.

As shown in FIG. 2, panel 2 includes a first surface 2a. FIG. 3 shows electronic device 101 shown in FIG. 2 from which cover 3 has been removed. First surface 2a has a contour line 10. Contour line 10 includes a first side 13. In the example shown in FIGS. 2 and 3, a side corresponding to a short side of a rectangle when the entire contour line 10 of first surface 2a is regarded as substantially rectangular is defined as "first side 13." When a corner of first surface 2a is rounded, a rounded portion of this corner may or may not be included in first side 13. One example of definition of first side 13 of panel 2 is schematically shown also in FIG. 20 which will be described later. Though a most part of first side 13 is hidden by cover 3 in FIG. 2, the most part of first side 13 is exposed without being hidden in FIG. 3. Panel 2 is held by case 1 such that first surface 2a faces outward. Contour line 10 has a first recess 15. First recess 15 is provided in first side 13 of contour line 10. Panel 2 has the first recess 15.

Figure 4:
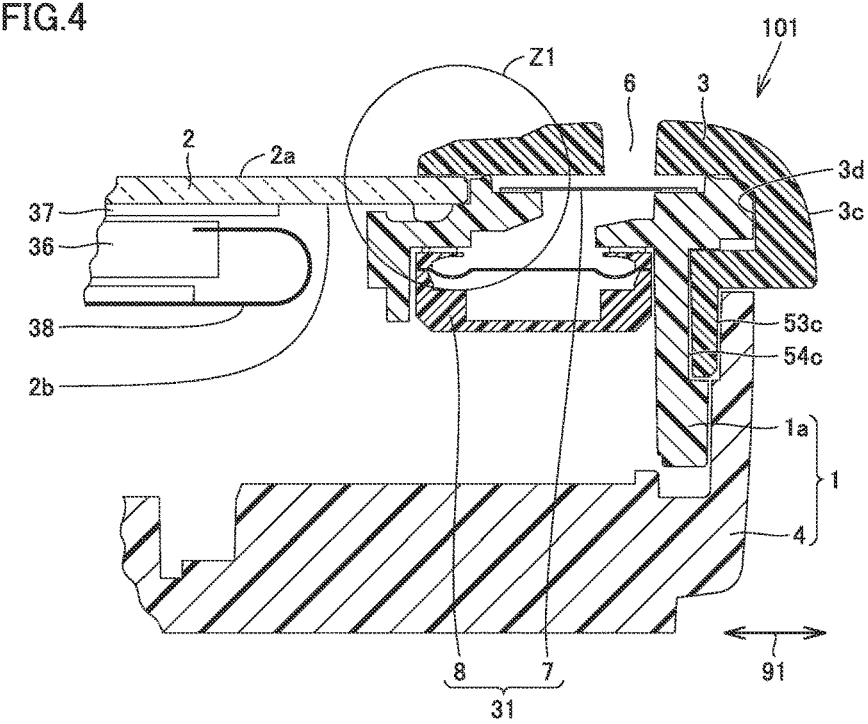
FIG. 4 is a cross-sectional view along the line IV-IV in FIG. 2.

FIG. 4 shows a cross-sectional view along the line IV-IV in FIG. 2. As shown in FIG. 4, electronic device 101 includes a first component 31 located in case 1. First component 31 includes a breathable film 7 and an acoustic component 8. In the example shown in FIG. 4, a display panel 36 is located to be superimposed on panel 2. A touch panel 37 is located between panel 2 and display panel 36.

Cover 3 is provided with a through hole or a cut for communication between first component 31 and the outside. In the example shown in FIGS. 1, 2, and 4, cover 3 is provided with a through hole 6. For example, through hole 6 may allow voice and sound emitted from first component 31 to be conveyed to the outside. The shape of through hole 6 shown in FIGS. 1, 2, and 4 is merely by way of example and not limited thereto. The through hole provided in cover 3 may be in a shape different from the shape shown here. Cover 3 may be provided with a cut instead of through hole 6, for communication between first component 31 and the outside. An example of cover 3 provided with a cut for communication between first component 31 and the outside will be described later in detail.

Cover 3 is located to hide first recess 15 when viewed in a direction perpendicular to first surface 2a. "When viewed in a direction perpendicular to first surface 2a" means view from a position as shown in FIG. 1 or 2. As shown in FIG. 2, cover 3 is located to hide first recess 15. Since first recess 15 is hidden by cover 3 in FIG. 2, it is shown with a dashed line.

Figure 5:
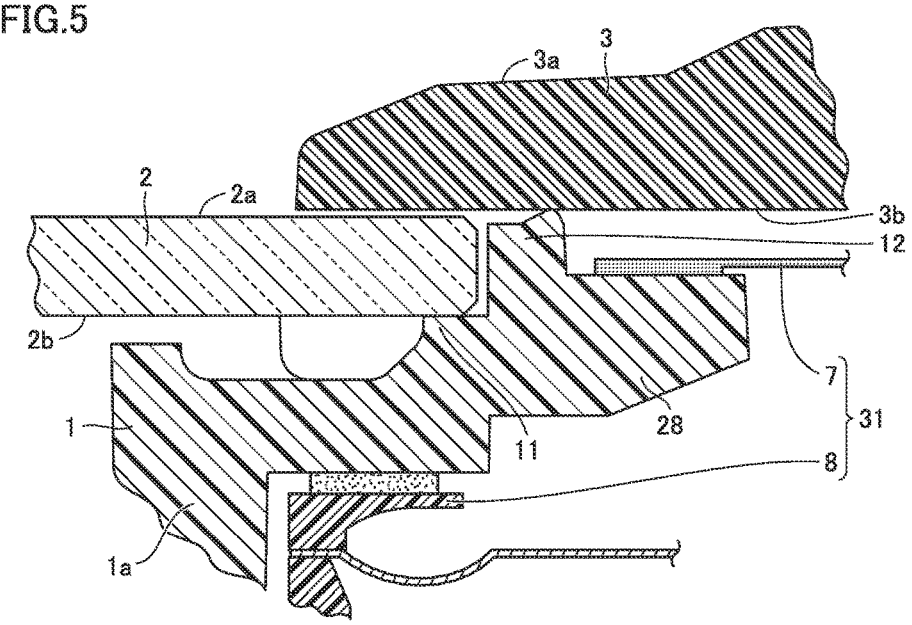
FIG. 5 is an enlarged view of a Z1 portion in FIG. 4.

FIG. 5 shows a Z1 portion in FIG. 4 as being enlarged. Panel 2 may be supported by at least a part of case 1. In this example, panel 2 is supported by a first housing component 1a. First housing component 1a is formed by a part or the entirety of case 1. Cover 3 may be in contact with case 1. Case 1 includes a projecting portion 28. Sounds emitted from acoustic component 8 do not necessarily travel upward in straight lines in FIG. 4 and pass through through hole 6 in cover 3, but may be guided to pass through through hole 6 at a position displaced as shown in FIG. 4. In the example shown in FIG. 4, through hole 6 is located at a position closer to an end of electronic device 101 than acoustic component 8. By designing as appropriate a shape of case 1, through hole 6 and acoustic component 8 at desired positions can be connected to each other through a path for passage of voice and sound. The path is not necessarily linear but may be bent as such. As shown in FIG. 5, case 1 has projecting portion 28 so that voice and sound can be guided to a position displaced from a region on which acoustic component 8 is projected. This is also applicable to a case that voice and sound enters through hole 6 from the outside of electronic device 101 and travels to acoustic component 8.

Figure 6:
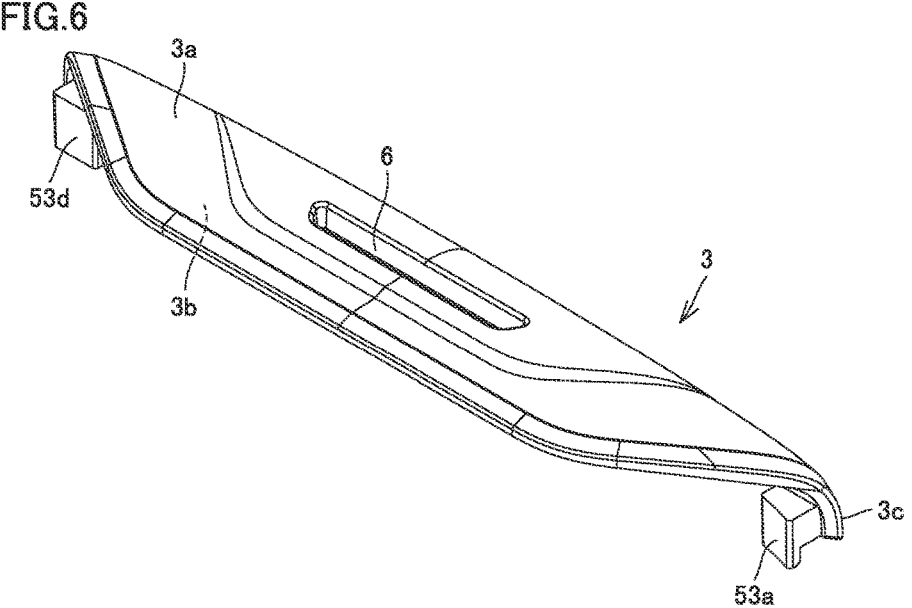
FIG. 6 is a first perspective view of the cover included in the electronic device in the first embodiment based on the present disclosure.
Figure 7:
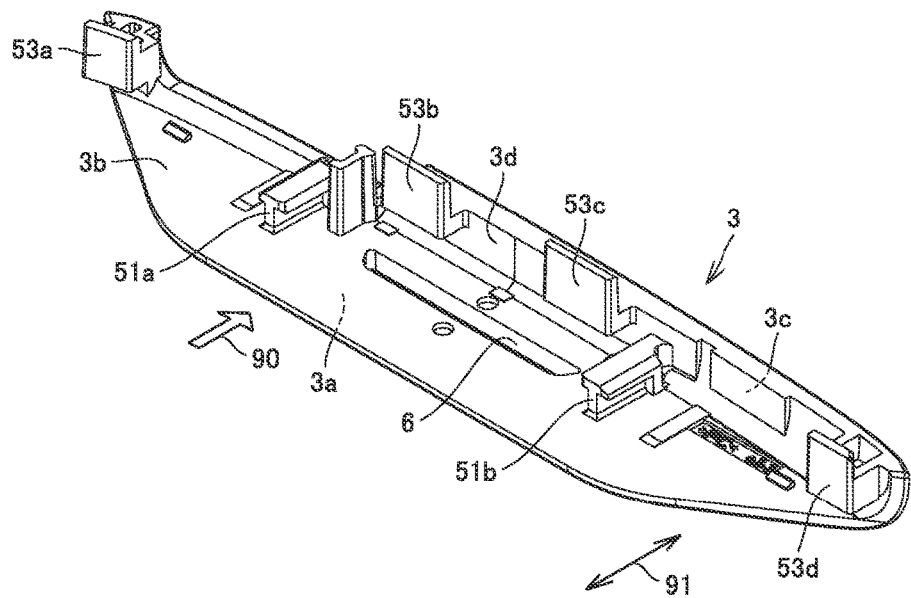
FIG. 7 is a second perspective view of the cover included in the electronic device in the first embodiment based on the present disclosure.

FIG. 6 shows cover 3 extracted alone. FIG. 7 shows cover 3 turned upside down. Cover 3 includes a second surface 3a, a third surface 3b, a fourth surface 3c, and a fifth surface 3d. Second surface 3a, third surface 3b, fourth surface 3c, and fifth surface 3d are not necessarily planar but may be curved. Second surface 3a, third surface 3b, fourth surface 3c, and fifth surface 3d may be provided with some kind of irregularities at the surface. Third surface 3b is located on a rear side of second surface 3a. Fifth surface 3d is located on a rear side of fourth surface 3c. Second surface 3a and fourth surface 3c may be substantially perpendicular to each other. Second surface 3a and fourth surface 3c may be connected to each other through a smooth curved surface. Third surface 3b and fifth surface 3d may be substantially perpendicular to each other.

Third surface 3b of cover 3 is provided with protrusions 51a and 51b. A cross-section of protrusions 51a and 51b is in a T shape and the protrusions extend in a certain direction 91. Protrusions 51a and 51b are in the T shape when viewed along an arrow 90. The "T shape" here refers to a concept encompassing shapes regarded as substantially a T shape, without being limited to the exact T shape. Each of protrusions 51a and 51b may have one end connected to fifth surface 3d.

Fifth surface 3d of cover 3 is provided with protrusions 53a, 53b, 53c, and 53d. Protrusions 53a, 53b, 53c, and 53d include a rectangular surface substantially in parallel to fifth surface 3d.

Figure 8:
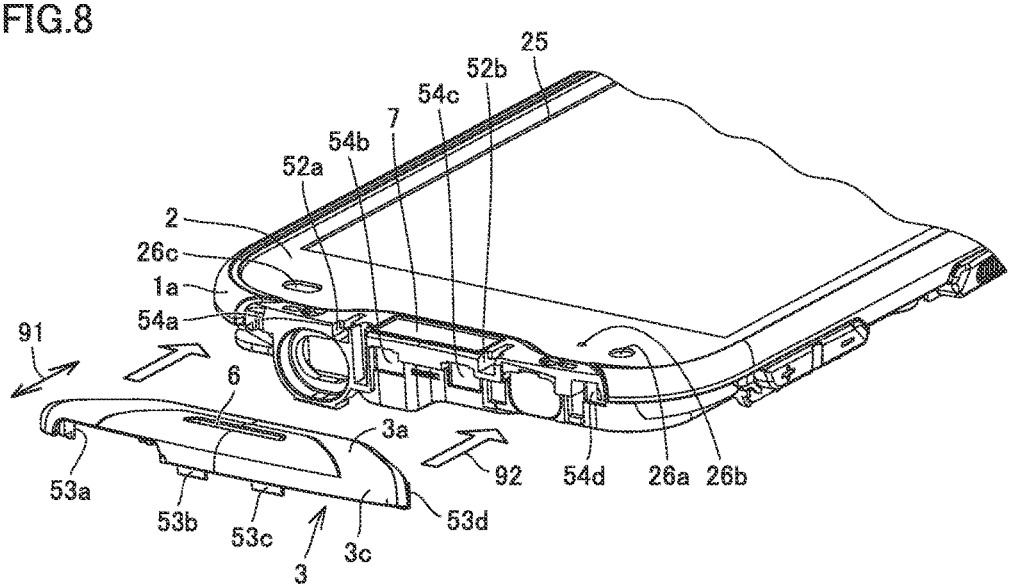
FIG. 8 is a diagram illustrating attachment of the cover to a main body.

FIG. 8 shows attachment of cover 3 to a main body which is an assembly of a plurality of components including first housing component 1a. Cover 3 is attached to first housing component 1a in an orientation shown with an arrow 92. First housing component 1a is a part of case 1. Cover 3 is attachable to and detachable from first housing component 1a along direction 91. First housing component 1a is provided with recesses 54a, 54b, 54c, and 54d. Recesses 54a, 54b, 54c, and 54d are substantially rectangular recesses.

Figure 9:
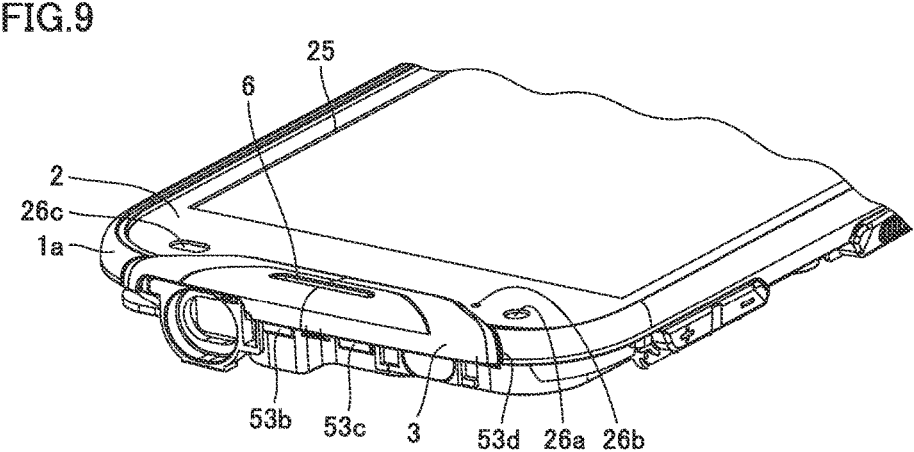
FIG. 9 is a partial perspective view of the cover attached to the main body.
Figure 10:
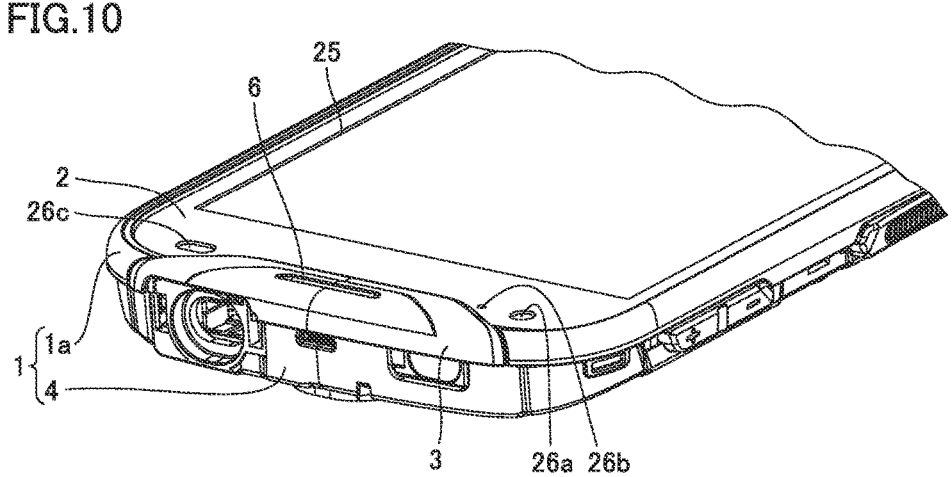
FIG. 10 is a partial perspective view of the cover and a second housing component attached to the main body.

Recesses 54a, 54b, 54c, and 54d receive protrusions 53a, 53b, 53c, and 53d, respectively. FIG. 9 shows a state after attachment of cover 3 to the main body. FIG. 10 shows an attached second housing component 4. Second housing component 4 is attached to the main body so as to cover a part of cover 3.

Figure 11:
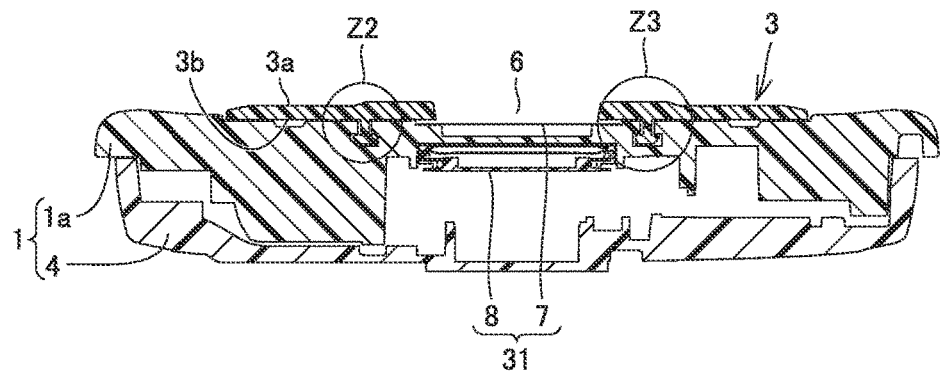
FIG. 11 is a cross-sectional view along the line XI-XI in FIG. 2.
Figure 12:
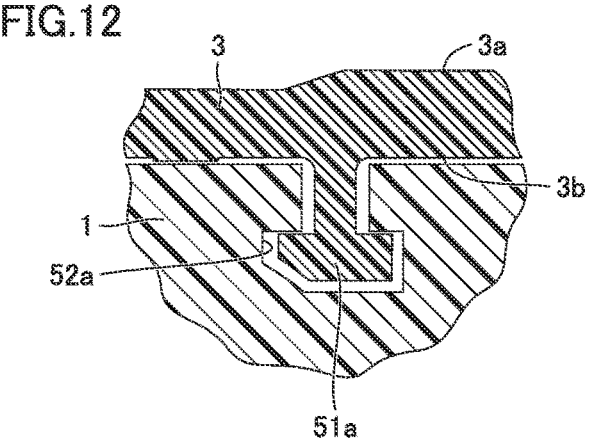
FIG. 12 is an enlarged view of a Z2 portion in FIG. 11.
Figure 13:
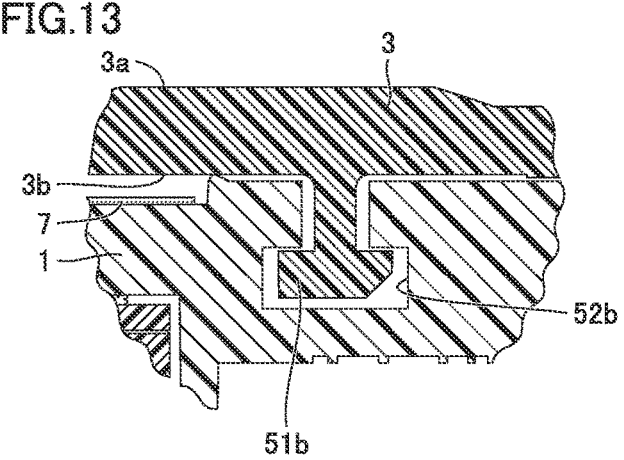
FIG. 13 is an enlarged view of a Z3 portion in FIG. 11.

FIG. 11 shows a cross-sectional view along the line XI-XI in FIG. 2. Cover 3 has been attached to case 1. FIG. 12 shows a Z2 portion in FIG. 11 as being enlarged. Protrusion 51a is accommodated in recess 52a. FIG. 13 shows a Z3 portion in FIG. 11 as being enlarged. Protrusion 51b is accommodated in recess 52b. Direction 91 in FIG. 8 corresponds to a front-rear direction with respect to the sheet surface in FIGS. 12 and 13.

In the first embodiment, contour line 10 of panel 2 is provided with first recess 15, and cover 3 provided with a through hole or a cut for communication between first component 31 and the outside is located to hide first recess 15. Therefore, first recess 15 of panel 2 is protected. Therefore, while a degree of freedom in locating components in the electronic device is enhanced by the presence of first recess 15, break of panel 2 can be minimized as cover 3 hides first recess 15.

As shown in the first embodiment, first component 31 may include acoustic component 8. Acoustic component 8 should only be a component involved with sound. Acoustic component 8 may be a component receiving input of sound or outputting sound. Acoustic component 8 may be a component for receiving input and providing output of sound. The acoustic component is not limited to a single component but may be an assembly of a plurality of components. When first component 31 is an acoustic component, a location not shielded by panel 2 is required for passage of sound. As shown in the first embodiment, since contour line 10 of panel 2 is provided with first recess 15, first component 31 can be located at this location and first component 31 can effectively be made use of without sound being shielded by panel 2. Therefore, convenience in locating components is achieved.

The first component is not limited to an acoustic component but may be other components. For example, the first component may include a button. Since a region not shielded by panel 2 is required also in locating a button in the electronic device, the above is also similarly applicable.

As shown in the first embodiment, first component 31 may include breathable film 7 located between acoustic component 8 and the cover. Breathable film 7 does not have to be in contact with acoustic component 8. Breathable film 7 is a part of first component 31. Presence of breathable film 7 as such can make it difficult for a foreign matter which is introduced through a through hole or a cut in cover 3 to reach acoustic component 8.

Breathable film 7 may be a waterproof breathable film. This feature can make it difficult for water which is introduced through a through hole or a cut in cover 3 to reach acoustic component 8. As the waterproof breathable film is appropriately located, the electronic device can be waterproof.

Acoustic component 8 may include at least any of a receiver, a microphone, and a speaker. In the first embodiment, acoustic component 8 has been shown to include a receiver by way of example. For example, when acoustic component 8 includes a receiver, a user can listen to voice and sound by positioning through hole 6 around an ear. For example, when acoustic component 8 includes a speaker, voice and sound can be emitted to the surroundings through through hole 6.

Panel 2 may include a screen panel.

Panel 2 may be composed mainly of sapphire. By adopting this feature, panel 2 can be excellent in such characteristics as smoothness.

Panel 2 may be, for example, in a form of a plate long in one direction. Panel 2 includes an inner main surface facing a display surface of display panel 36 and an outer main surface located opposite to the inner main surface. The outer main surface is synonymous with first surface 2a. Panel 2 may be composed of sapphire single crystals. The sapphire single crystal here refers to a single crystal of alumina ($Al_2O_3$), and refers to a single crystal of which $Al_2O_3$ purity is approximately not lower than 90%. When the purity of $Al_2O_3$ is not lower than 99%, flaw to panel 2 can be less likely and crack or chipping can be less likely. A material for panel 2 is not limited to sapphire, but for example, glass or a resin may be employed.

Panel 2 includes transparent display area 25 through which representation on display panel 36 passes. Display area 25 is also called a display window. Display area 25 is, for example, rectangular when viewed two-dimensionally. Visible light output from display panel 36 passes through display area 25 and is extracted to the outside of electronic device 101. A user can visually recognize from the outside of electronic device 101, information shown on display panel 36 through display area 25.

A most part of a peripheral end portion (peripheral edge portion) of panel 2, which surrounds display area 25, may be black, for example, by applying a film. The most part of the peripheral end portion may thus be a non-display portion through which representation on display panel 36 does not pass.

Cover 3 may be composed mainly of a resin. Since shock can be absorbed by cover 3 to some extent by adopting this feature, shock resistance of the electronic device can be enhanced.

As shown in FIG. 4, case 1 may include first housing component 1a and second housing component 4. Cover 3 includes a first portion engaged with first housing component 1a. Cover 3 may be fixed as second housing component 4 is combined with case 1 while cover 3 is engaged with first housing component 1a by means of the first portion. The "first portion" here includes protrusions 51a and 51b, protrusions 53a, 53b, 53c, and 53d, recesses 52a and 52b, and recesses 54a, 54b, 54c, and 54d. In FIG. 4, protrusion 53c and recess 54c which are a part of the first portion are seen. In FIG. 4, while protrusion 53c is accommodated in recess 54c, second housing component 4 covers a right side thereof. As second housing component 4 is thus combined with first housing component 1a, protrusion 53c cannot be removed from recess 54c. Cover 3 is thus fixed. Though description has been given here with attention being paid to relation between protrusion 53c, recess 54c, and second housing component 4, this is also applicable to protrusion 51a and recess 52a. As second housing component 4 is combined with first housing component 1a, protrusion 51a cannot be removed from recess 52a. This is also applicable to protrusion 51b and recess 52b, to protrusion 53b and recess 54b, to protrusion 53d and recess 54d, and to protrusion 53a and recess 54a. By adopting this feature, unless second housing component 4 is removed first, it is difficult for cover 3 to be removed from first housing component 1a.

Therefore, such a situation that cover 3 is undesirably removed when shock is applied to the electronic device can be less likely to occur.

As shown in the first embodiment, the first portion includes such a structure that cover 3 is fitted to first housing component 1*a* as the cover is slid in direction 91 in parallel to first surface 2*a*, and second housing component 4 may be combined with first housing component 1*a* so as to cover at least a part of the first portion. In the example shown here, the first portion includes protrusions 51*a* and 51*b* as the "structure that cover 3 is fitted to first housing component 1*a* as the cover is slid in direction 91 in parallel to first surface 2*a*." This is merely by way of example and other structures may be applicable.

Figure 14:
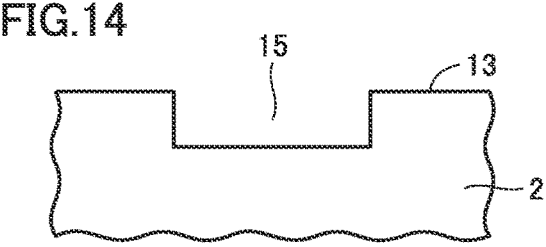
FIG. 14 is a plan view of a first example of a first recess in a panel.
Figure 15:
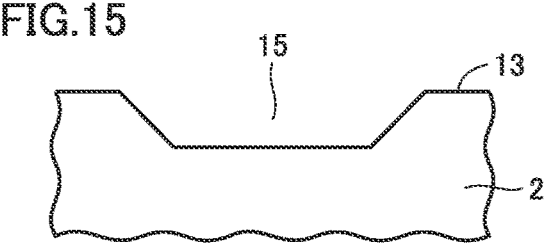
FIG. 15 is a plan view of a second example of the first recess in the panel.
Figure 16:
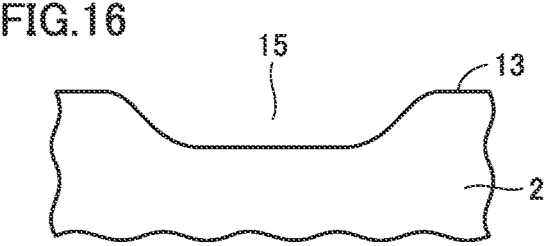
FIG. 16 is a plan view of a third example of the first recess in the panel.

As described above, first recess 15 is a recess located in first side 13 of first surface 2*a* of panel 2. A variation of first recess 15 will be described below. First recess 15 may be a rectangular recess, for example, as shown in FIG. 14. First recess 15 may be a trapezoidal recess as shown in FIG. 15. As compared with rectangular first recess 15 as shown in FIG. 14, with trapezoidal first recess 15 as shown in FIG. 15, a corner at a right angle can be eliminated and strength of panel 2 can be enhanced. As shown in FIG. 16, by rounding a corner of the trapezoidal recess, break due to shock can further be less likely. The recess shown in FIG. 16 is in a shape close to that of first recess 15 shown in FIG. 3. As shown in FIG. 3, first recess 15 may be a trapezoidal recess with a rounded corner when viewed in a direction perpendicular to first surface 2*a*. When first surface 2*a* is two-dimensionally viewed, first recess 15 includes two oblique sides, and the two oblique sides may be in such a tapered shape that first recess 15 is smaller in width toward the bottom of first recess 15.

Figure 17:
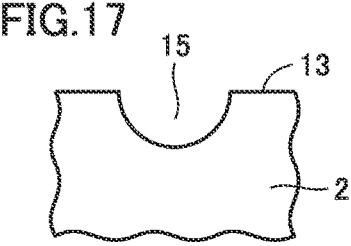
FIG. 17 is a plan view of a fourth example of the first recess in the panel.
Figure 18:
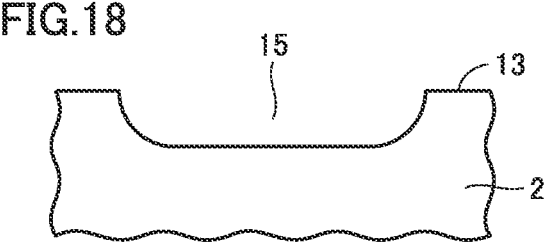
FIG. 18 is a plan view of a fifth example of the first recess in the panel.

First recess 15 is provided mainly in order to easily ensure a space for communication between first component 31 and the outside. When a space to be ensured is small, however, the first recess may be as shown in FIG. 17. In the example shown in FIG. 17, first recess 15 is semicircular. When a space to be ensured is of a certain length, a width of first recess 15 may be increased, with a shape as shown in FIGS. 14 to 16. For example, as shown in FIG. 18, first recess 15 may be provided in a shape of two quadrants and one straight line as being combined.

Figure 19:
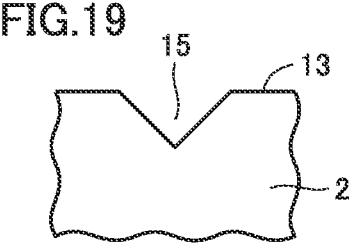
FIG. 19 is a plan view of a sixth example of the first recess in the panel.

Furthermore, for example, as shown in FIG. 19, first recess 15 may be provided as a V-shaped recess. FIGS. 14 to 19 show merely some representative examples, and actually, various shapes other than those mentioned here can be adopted as the shape of first recess 15.

Figure 20:
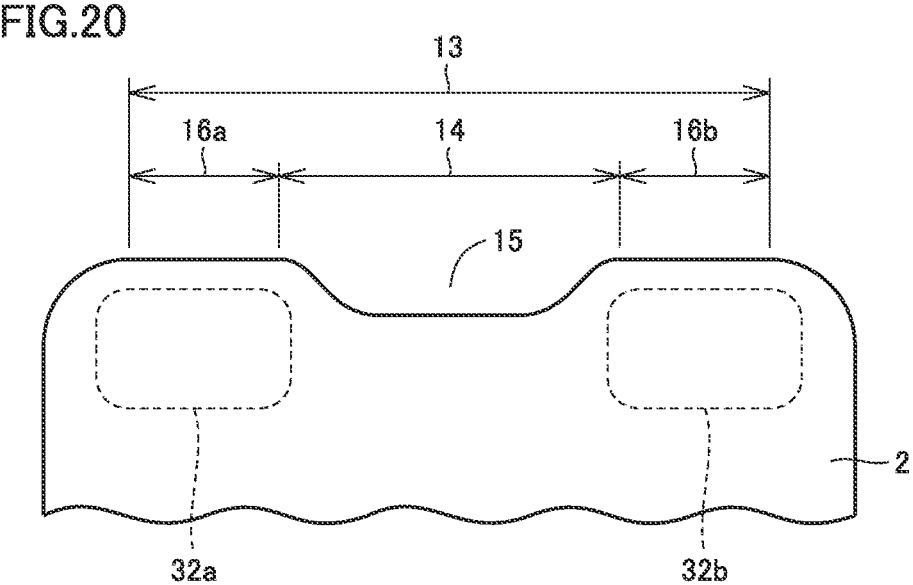
FIG. 20 is a diagram illustrating an example of locating another component in a portion of the panel where no first recess is provided.

Though description has been given in the first embodiment with first component 31 being assumed to be located in case 1, various components other than first component 31 may be located in case 1. When first side 13 of first surface 2*a* of panel 2 is provided with first recess 15 and there are other components to be located as being superimposed on panel 2, other components may be located in a portion where no first recess 15 is provided. Since it can be concluded that the portion where no first recess 15 is provided projects relative to first recess 15, other components can be located so as to be superimposed on this projecting portion. FIG. 20 shows one example. Though FIG. 20 does not show case 1, an internal space in case 1 extends toward the rear of panel 2 with respect to the sheet surface in FIG. 20. Contour line 10 includes a first section 14 where first recess 15 is located and second sections 16*a* and 16*b* which continue to first section 14 and project relative to first section 14. As shown in FIG. 20, second components 32*a* and 32*b* may be located in case 1 so as to be superimposed on panel 2 in second sections 16*a* and 16*b*. By adopting this feature, each component can be located with a limited space effectively being used. Second components 32*a* and 32*b* are not necessarily completely accommodated in the portion which relatively projects owing to absence of first recess 15. As shown in FIG. 20, only a part rather than the entirety of second components 32*a* and 32*b* may be located to be introduced into the projecting portion.

FIGS. 2 and 3 show regions 26*a*, 26*b*, and 26*c*. Regions 26*a*, 26*b*, and 26*c* may be, for example, regions for entry or exit of light through panel 2. Regions 26*a*, 26*b*, and 26*c* may be regions for passage of something other than light. In regions 26*a*, 26*b*, and 26*c*, some kind of opening does not have to be provided in panel 2. In regions 26*a*, 26*b*, and 26*c*, some kind of component may be located in case 1. Examples of components to be located in case 1 so as to be able to make use of regions 26*a*, 26*b*, and 26*c* include a light emitting diode, an illumination sensor, and a proximity sensor. Second components 32*a* and 32*b* may be any of these. When the second component is a light emitting diode, light can exit through panel 2 to the outside so that an indicator for informing a user of some kind of information from the electronic device can be provided. When the second component is an illumination sensor, external light can be received through panel 2 and brightness of an external environment can be detected.

Second Embodiment

In the first embodiment, an example where cover 3 is provided with through hole 6 for communication between first component 31 and the outside has been described as electronic device 101. As described above, cover 3 may be provided with a cut instead of through hole 6. Therefore, an example where cover 3 is provided with a cut is shown as a second embodiment. Description of matters common to the first embodiment will not be repeated in the second embodiment.

Figure 21:
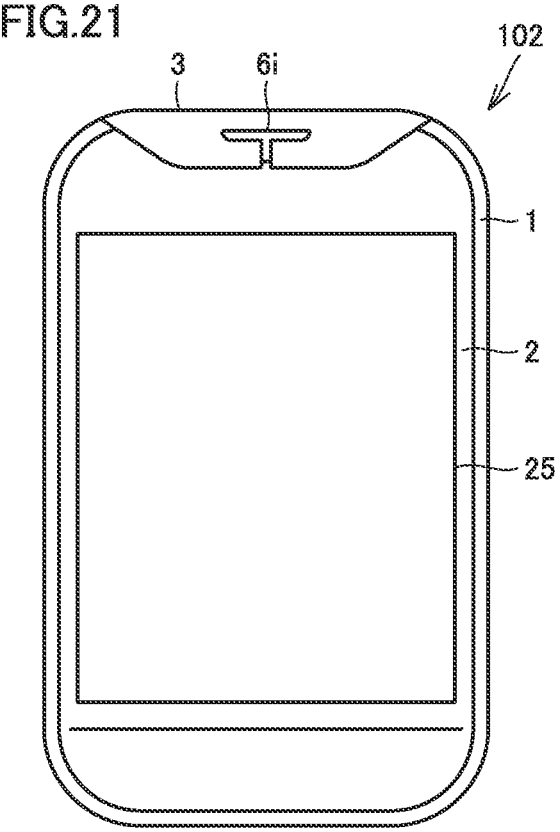
FIG. 21 is a plan view of a first example of an electronic device in a second embodiment based on the present disclosure.

A first example of an electronic device in the second embodiment based on the present disclosure may be, for example, a feature like an electronic device 102 shown in FIG. 21. In electronic device 102, cover 3 is provided with a cut 6*i*. Cut 6*i* is in a T shape and opens toward the center of panel 2. In FIG. 21, a part of a contour line of panel 2 is seen in cut 6*i*.

Figure 22:
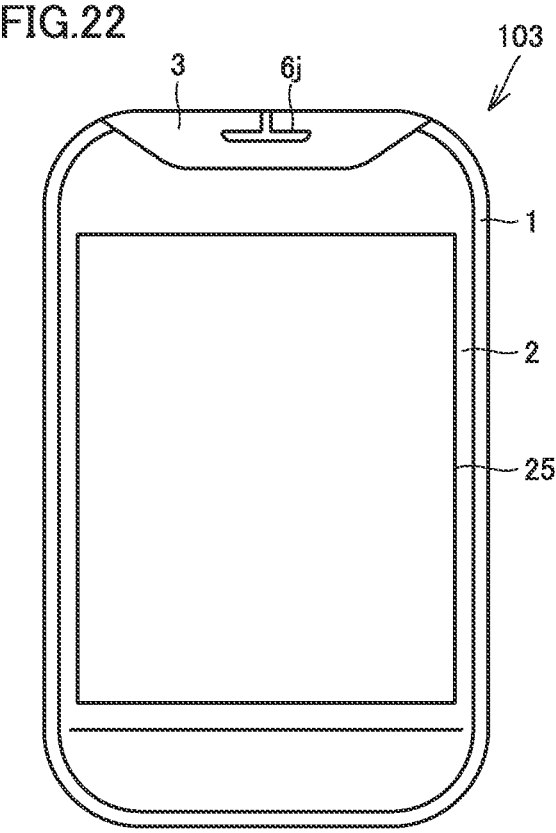
FIG. 22 is a plan view of a second example of an electronic device in the second embodiment based on the present disclosure.

A second example of an electronic device in the second embodiment based on the present disclosure may be, for example, a feature like an electronic device 103 shown in FIG. 22. In electronic device 103, cover 3 is provided with a cut 6*j*. Cut 6*j* is in an inverted T shape and opens toward a side away from panel 2, that is, toward an end of electronic device 103.

Figure 23:
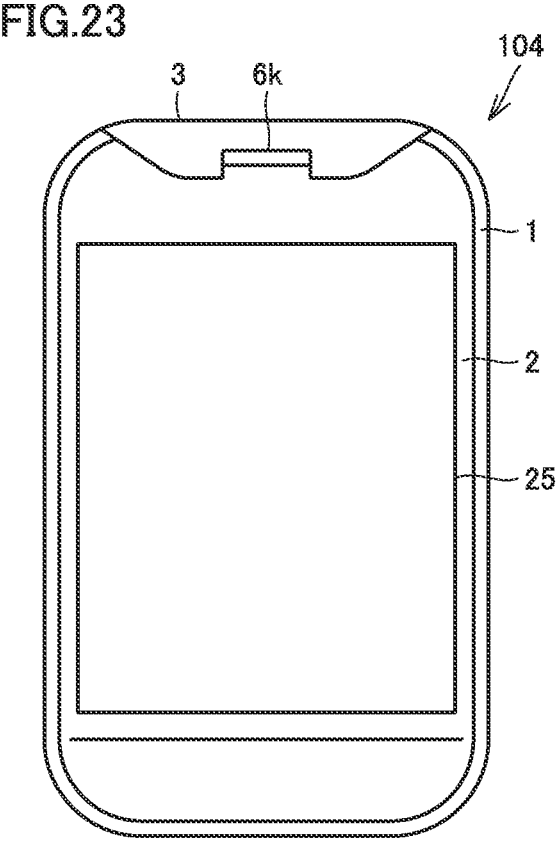
FIG. 23 is a plan view of a third example of an electronic device in the second embodiment based on the present disclosure.

A third example of an electronic device in the second embodiment based on the present disclosure may be, for example, a feature like an electronic device 104 shown in FIG. 23. In electronic device 104, cover 3 is provided with a cut 6*k*. Cut 6*k* opens toward the center of panel 2. As shown in FIG. 23, cut 6*k* may be constant in width. Cut 6*k* may be in a shape variable in width. In FIG. 23, a part of a contour line of panel 2 is seen in cut 6*k*.

Figure 24:
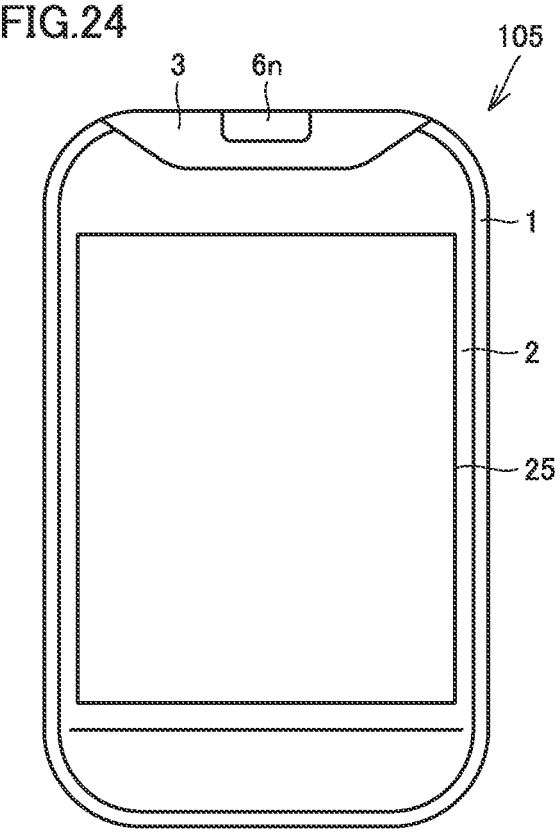
FIG. 24 is a plan view of a fourth example of an electronic device in the second embodiment based on the present disclosure.

A fourth example of an electronic device in the second embodiment based on the present disclosure may be, for example, a feature like an electronic device 105 shown in FIG. 24. In electronic device 105, cover 3 is provided with a cut 6*n*. Cut 6*n* opens toward a side away from panel 2, that is, toward an end of electronic device 105. As shown in FIG. 24, cut 6*n* may be constant in width. Cut 6*n* may be in a shape variable in width.

Though several shapes of a cut have been exemplified in connection with the electronic device in the second embodiment, these are merely by way of example and a shape of a cut is not limited to that shown here. A cut may be in a shape different from the shape shown here.

Though FIGS. 21 to 24 show also examples in which a part of the contour line of the panel is seen in a cut, a cut provided in the cover may thus expose a part of the contour line of the panel. A line defining a part of the first recess may be exposed in a cut provided in the cover. The cover may be located to hide a part of the first recess when the first surface is two-dimensionally viewed.

Third Embodiment

An electronic device in a third embodiment based on the present disclosure will be described with reference to FIGS. 3, 5, and 25 to 30. Though the electronic device in the third embodiment may be the same in construction as the electronic device in the first embodiment, a feature to which attention is paid is different from the feature in the first embodiment. Therefore, this embodiment will be described as an embodiment separate from the first embodiment.

Figure 25:
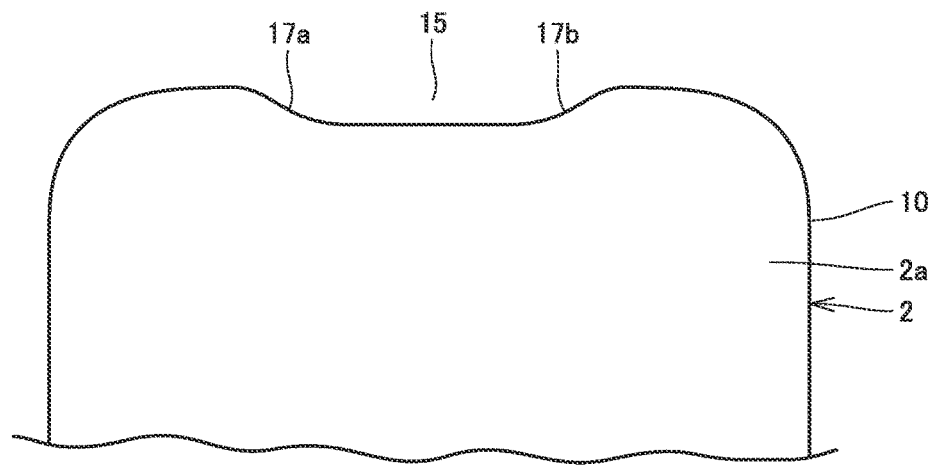
FIG. 25 is a partial plan view of the panel included in an electronic device in a third embodiment based on the present disclosure.

FIG. 25 shows a part of panel 2 taken out alone from the electronic device in the third embodiment. When first surface 2*a* is two-dimensionally viewed, first recess 15 has a first oblique side 17*a* and a second oblique side 17*b*, and first oblique side 17*a* and second oblique side 17*b* form such a tapered shape that first recess 15 is smaller in width toward the bottom of first recess 15.

Figure 26:
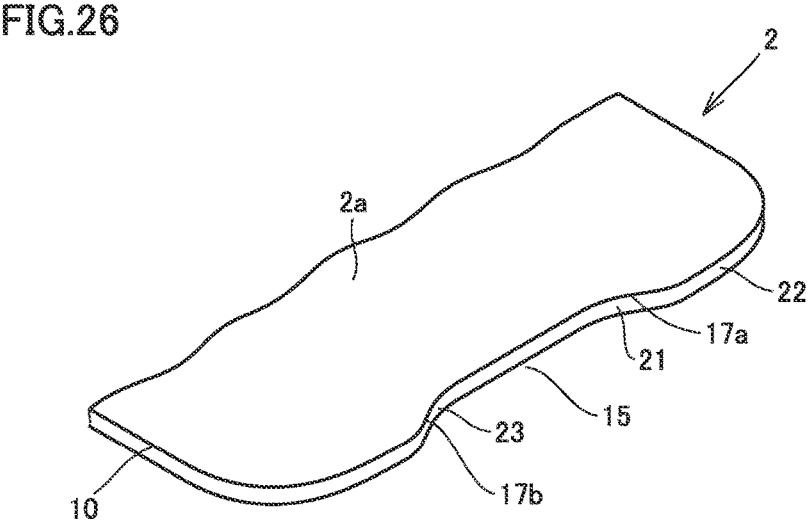
FIG. 26 is a partial perspective view of the panel included in the electronic device in the third embodiment based on the present disclosure.
Figure 27:
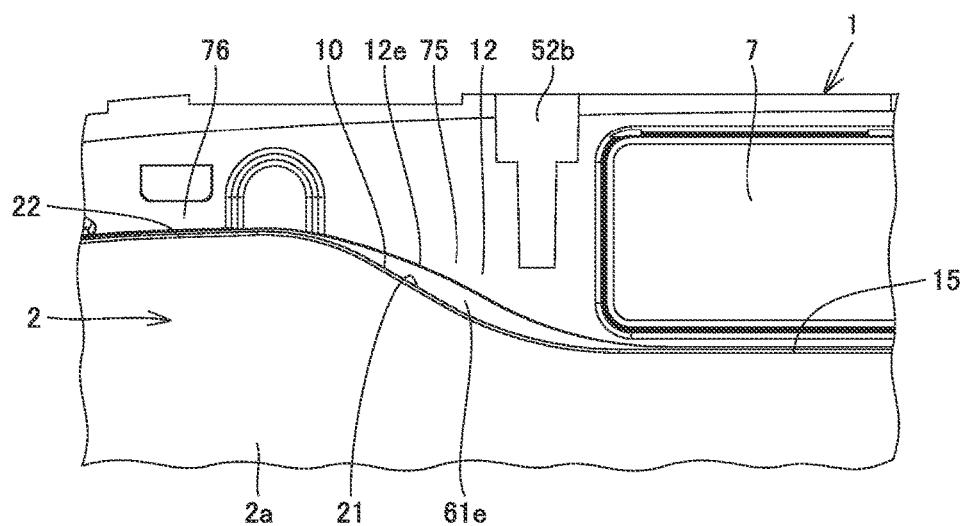
FIG. 27 is a partially enlarged plan view of the electronic device in the third embodiment based on the present disclosure from which the cover has been removed.
Figure 28:
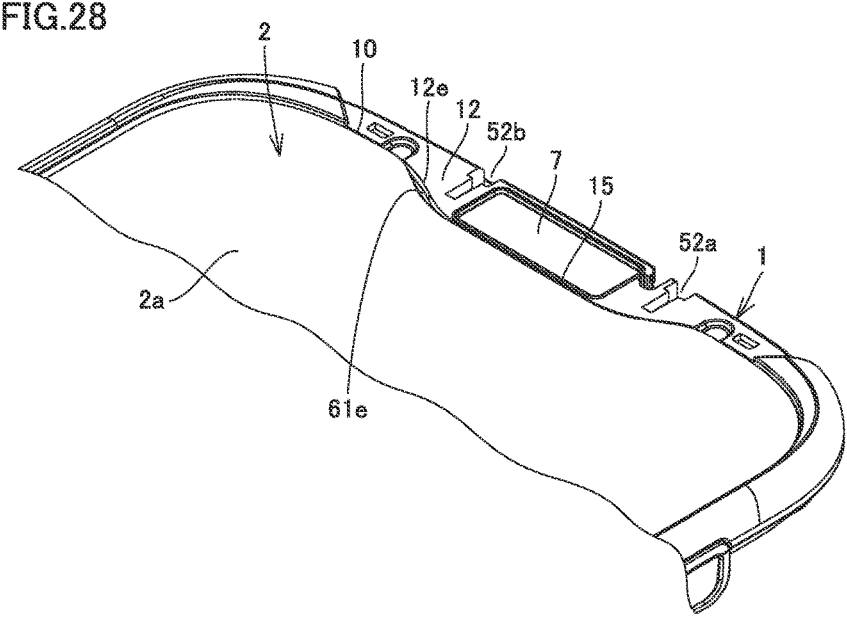
FIG. 28 is a partial perspective view of the electronic device in the third embodiment based on the present disclosure from which the cover has been removed.
Figure 29:
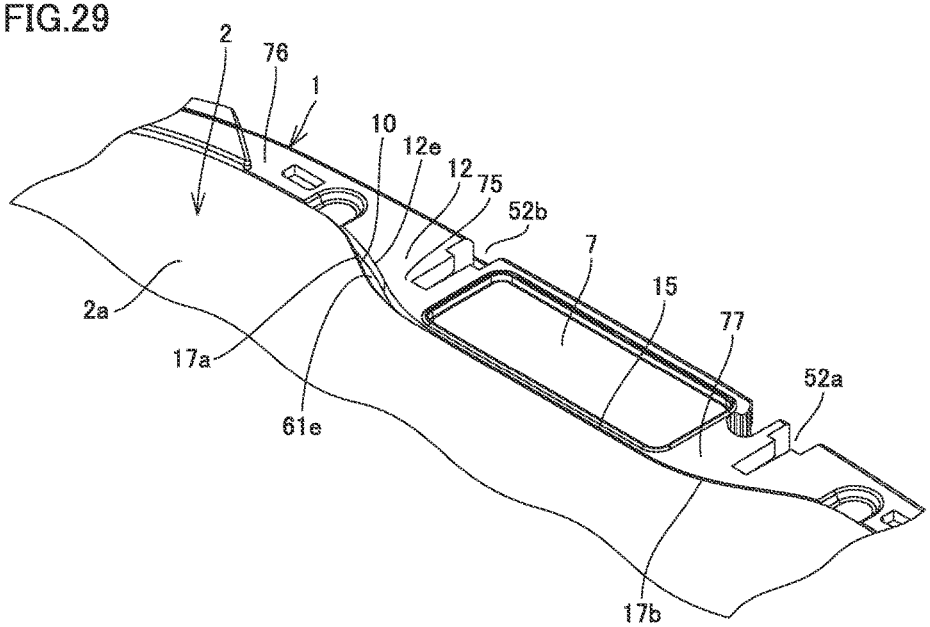
FIG. 29 is a partial perspective view of a part in FIG. 28 as being further enlarged.

FIG. 26 shows a perspective view of a portion in the vicinity of first recess 15 of panel 2. The state of the electronic device in the third embodiment from which cover 3 has been removed is the same as the state shown in FIG. 3 in the first embodiment. In FIG. 3, a gap 61*e* is seen between contour line 10 of panel 2 and a part of case 1. Gap 61*e* is provided along a part of contour line 10 on an inner side of first recess 15. FIG. 27 shows a portion in the vicinity of gap 61*e* in FIG. 3 as being enlarged. FIG. 28 shows a perspective view of a portion in the vicinity of first recess 15 in FIG. 3. FIG. 29 shows a part of FIG. 28 as being further enlarged.

As shown in FIG. 26, panel 2 includes a first side surface 21 located along at least a part of first recess 15 and a second side surface 22 located along any portion of contour line 10 other than first recess 15. As shown in FIG. 27, case 1 includes a first site 75 opposed to first side surface 21 and a second site 76 opposed to second side surface 22. A length between first side surface 21 and first site 75 is longer than a length between second side surface 22 and second site 76.

A length between a side surface of panel 2 and a site of the case opposed to the side surface, when such a length is mentioned, herein means a minimum length of possible lengths.

As shown in FIGS. 25 and 26, when first recess 15 includes first oblique side 17*a* and second oblique side 17*b*, such an example can be expressed as below. Panel 2 includes first side surface 21 located along first oblique side 17*a* and second side surface 22 located along any portion of contour line 10 other than first recess 15. Case 1 includes first site 75 opposed to first side surface 21 and second site 76 opposed to second side surface 22. A length between first side surface 21 and first site 75 is longer than a length between second side surface 21 and second site 76.

Figure 30:
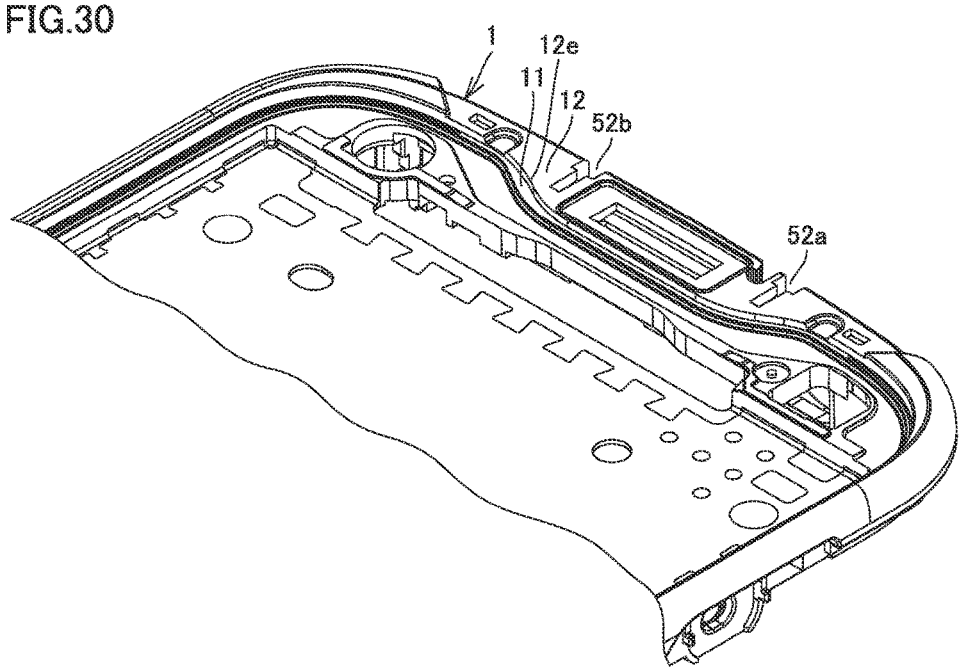
FIG. 30 is a partial perspective view of a structure shown in FIG. 29 from which the panel and the like has been removed.

FIG. 30 shows the structure shown in FIG. 28 from which panel 2, breathable film 7, and the like have been removed. Case 1 includes a case first portion 11 and a case second portion 12. As shown in FIG. 30, case first portion 11 and case second portion 12 each have an upper surface. The upper surface of case first portion 11 and the upper surface of case second portion 12 are different from each other in height.

As shown in FIG. 5, case 1 includes case first portion 11 abutting to a surface 2*b* opposite to first surface 2*a* of panel 2 and case second portion 12 projecting from case first portion 11 in a direction perpendicular to first surface 2*a*. As shown in FIG. 27, a contour line of case second portion 12 when viewed in the direction perpendicular to first surface 2*a* includes a portion 12*e* located away from a line offset from contour line 10 of first surface 2*a* in a direction away from panel 2 at least in first recess 15, in a direction further away from panel 2. By adopting this construction, transmission of deformation of case 1 to panel 2 can be less likely owing to the presence of gap 61*e* defined by portion 12*e*. In the presence of gap 61*e*, deformation of case 1 can be allowed to some extent. Therefore, a probability of break of panel 2 due to a load applied to panel 2 by a deformed portion of case 1 in the vicinity of first recess 15 of panel 2 when shock due to drop is applied to the electronic device can be lowered.

In the example shown in FIG. 3, when first surface 2*a* is two-dimensionally viewed, first recess 15 includes two oblique sides and these two oblique sides form such a tapered shape that first recess 15 is smaller in width toward the bottom of first recess 15. When there are two such oblique sides, portion 12*e* located away from the line offset from contour line 10 of first surface 2*a* may be provided along one of the two oblique sides. By adopting this construction, a probability of break of panel 2 due to a load applied to panel 2 by a deformed portion of case 1 in one of the oblique sides when shock due to drop is applied to the electronic device can be lowered.

Fourth Embodiment

Figure 31:
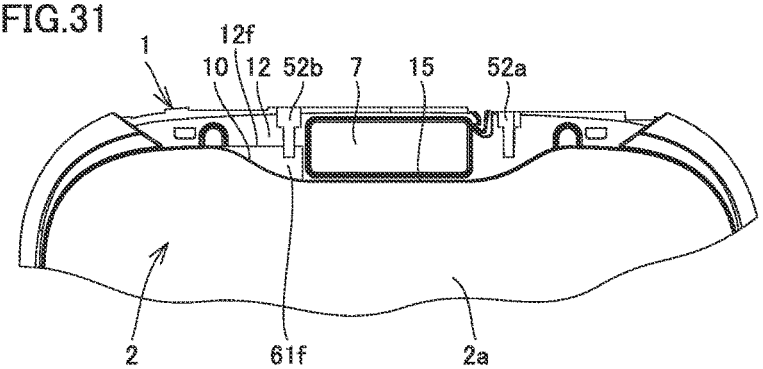
FIG. 31 is a partially enlarged plan view of an electronic device in a fourth embodiment based on the present disclosure from which the cover has been removed.
Figure 32:
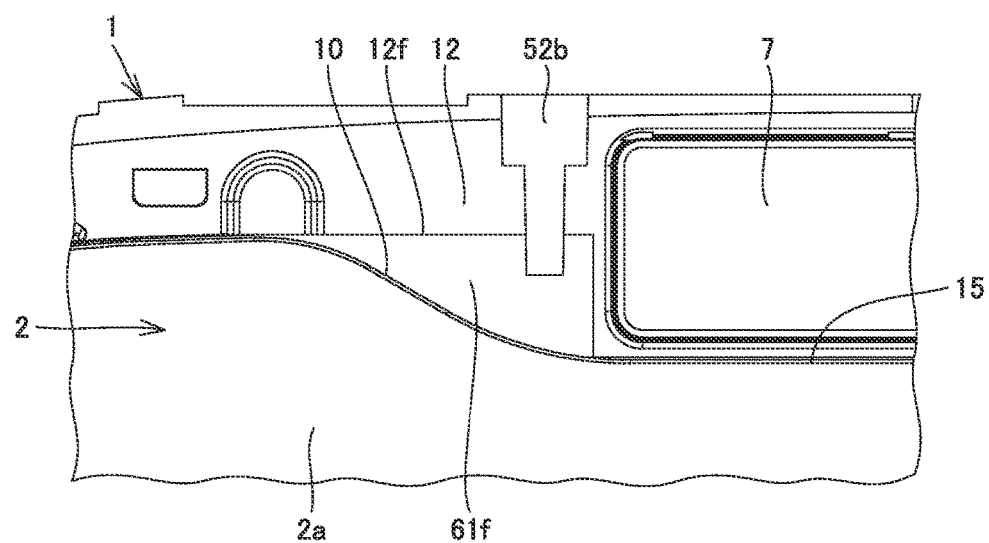
FIG. 32 is a partial plan view of a part in FIG. 31 as being further enlarged.

An electronic device in a fourth embodiment based on the present disclosure will be described with reference to FIGS. 31 to 32. FIG. 31 shows the electronic device in the fourth embodiment from which cover 3 has been removed. FIG. 32 shows a part of FIG. 31 as being enlarged.

In the third embodiment, the contour line of case second portion 12 includes portion 12*e* located away from the line offset from contour line 10 of first surface 2*a*. The electronic device in the fourth embodiment includes a portion 12*f* instead of portion 12*e*. Portion 12*f* is greater than portion 12*e* in an extent of being away from the line offset from contour line 10. In portion 12*f*, the contour line of case second portion 12 is in a shape not associated with an oblique side of panel 2. As a result of considerable retraction of portion 12*f*, a gap 61*f* is provided between case second portion 12 and panel 2. Gap 61*f* is substantially in a shape of a right triangle. By adopting this construction, in portion 12*f*, the contour line of case second portion 12 is significantly distant from contour line 10 of first surface 2*a* of panel 2. Therefore, a probability of break of panel 2 due to a load applied to panel 2 by a deformed portion of case 1 can further be lowered.

Though a corner at the right angle of case second portion 12 is in contact with contour line 10 in the lower right portion of gap 61*f* in FIG. 32, this corner may be rounded rather than being at a right angle. Panel 2 is less likely to break because points where force is applied can be distributed when the corner is rounded.

Though portions 12e and 12f located away are provided in connection with only one of the two oblique sides of first recess 15 in the third and fourth embodiments, the portion located away may be provided in both of the two oblique sides. When the portion located away is provided in both of the two oblique sides of first recess 15, the portions located away may be provided symmetrically or asymmetrically.

Fifth Embodiment

Figure 33:
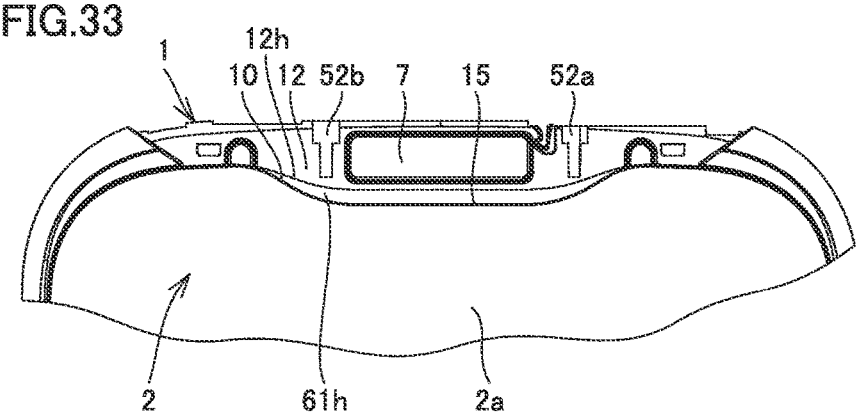
FIG. 33 is a partially enlarged plan view of an electronic device in a fifth embodiment based on the present disclosure from which the cover has been removed.
Figure 34:
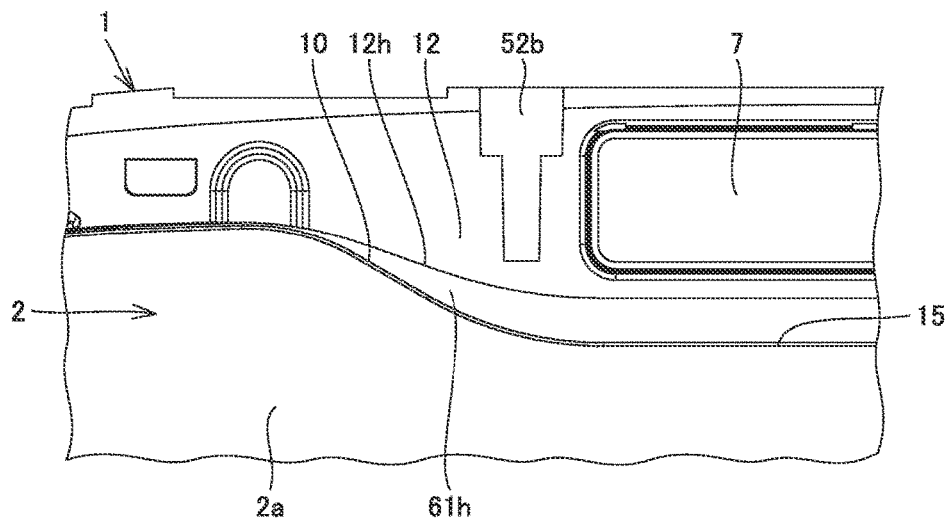
FIG. 34 is a partial plan view of a part in FIG. 33 as being further enlarged.

An electronic device in a fifth embodiment based on the present disclosure will be described with reference to FIGS. 33 to 34. FIG. 33 shows the electronic device in the fifth embodiment from which cover 3 has been removed. FIG. 34 shows a part of FIG. 33 as being enlarged.

In the third embodiment, the contour line of case second portion 12 includes portion 12e located away from the line offset from contour line 10 of first surface 2a. The electronic device in the fifth embodiment includes a portion 12h instead of portion 12e. Portion 12h is longer in section located away from the line offset from contour line 10 than portion 12e. Portion 12h is located away from the line offset from contour line 10 entirely from the left end to the right end of first recess 15. By adopting this construction, in portion 12h, the contour line of case second portion 12 is constantly distant from contour line 10 of first surface 2a of panel 2 over a wide range. Therefore, a probability of break of panel 2 due to a load applied to panel 2 by a deformed portion of case 1 can be lowered.

Sixth Embodiment

An electronic device in a sixth embodiment based on the present disclosure will be described with reference to FIGS. 26 and 35 to 37. Though the electronic device in the sixth embodiment may be the same in construction as the electronic device in the first embodiment, a feature to which attention is paid is different from the feature in the first embodiment. Therefore, this embodiment will be described as an embodiment separate from the first embodiment.

Figure 35:
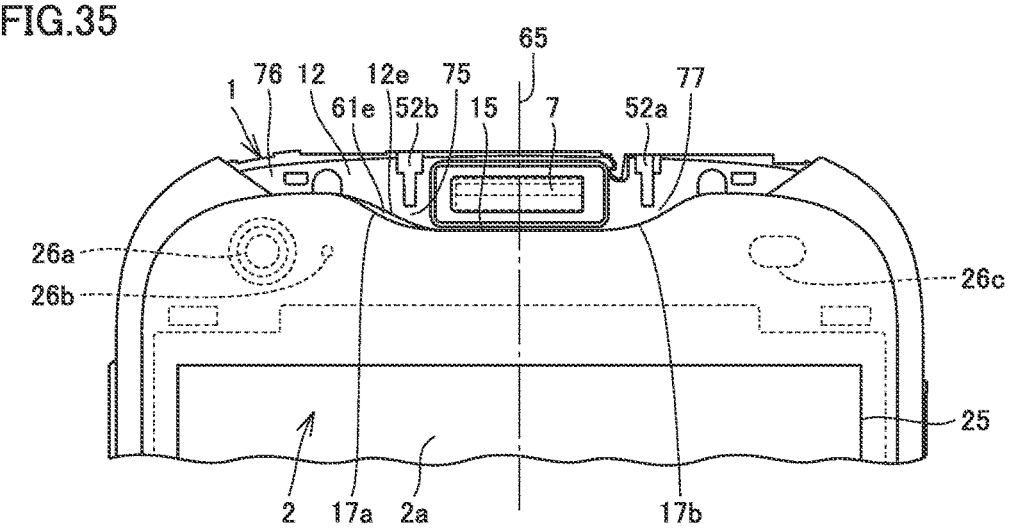
FIG. 35 is a partially enlarged plan view of an electronic device in a sixth embodiment based on the present disclosure from which the cover has been removed.
Figure 36:
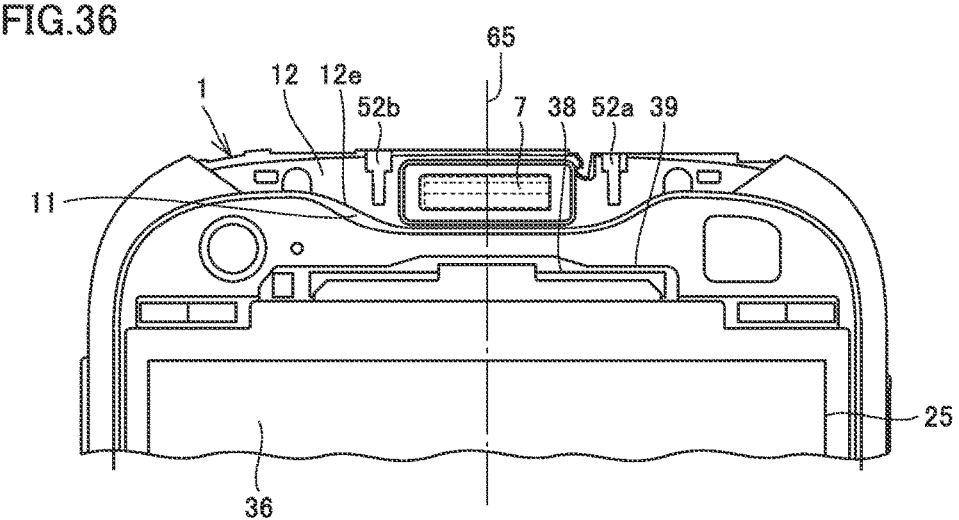
FIG. 36 is a partially enlarged plan view of a structure shown in FIG. 35 from which the panel has been removed.

FIG. 35 shows the electronic device in the sixth embodiment from which cover 3 has been removed. FIG. 33 shows a line 65 which passes through the center of first recess 15. FIG. 36 shows the structure shown in FIG. 35 from which panel 2 has been removed. In FIG. 36, touch panel 37 (see FIG. 4) has also been removed with removal of panel 2. In FIG. 36, display panel 36 is seen. Flexible substrate 38 extends from one end of display panel 36. In case 1, an opening portion 39 is provided. Opening portion 39 is greater in width than flexible substrate 38. Flexible substrate 38 is pulled out through opening portion 39 from a front side to a rear side in FIG. 36.

Figure 37:
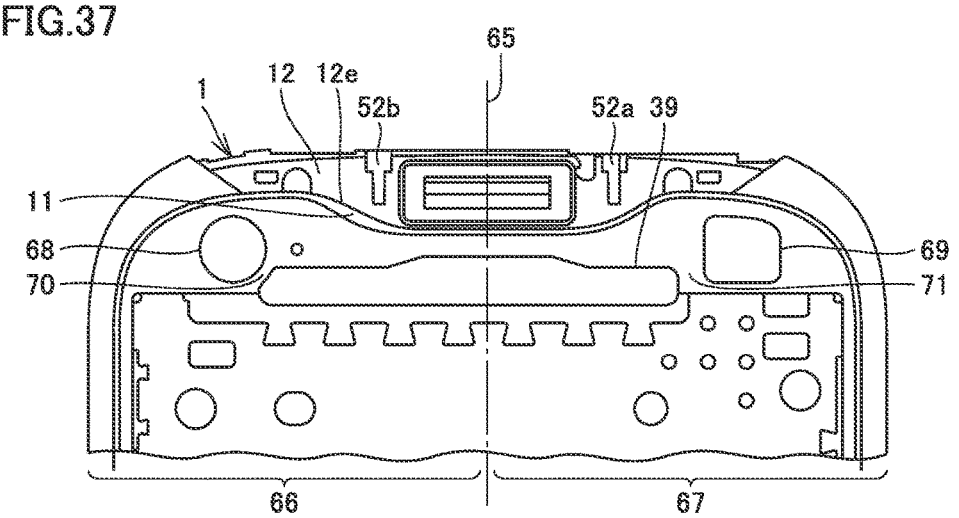
FIG. 37 is a partially enlarged plan view of the structure shown in FIG. 36 from which a display panel has been removed.

FIG. 37 shows the structure shown in FIG. 36 from which display panel 36 has been removed. In FIG. 37, flexible substrate 38 has also been removed with removal of display panel 36. Opening portion 39 provided in case 1 is located at a position asymmetric with respect to line 65. In case 1, opening portions 68 and 69 are provided. Case 1 is in an asymmetric structure, with opening portion 39 and opening portions 68 and 69. Case 1 can be considered as being divided into two regions 66 and 67. Case 1 includes constriction portions 70 and 71. Constriction portion 70 in region 66 is smaller in width than constriction portion 71 in region 67. In the sixth embodiment, region 66 is more likely to deform than region 67 owing to a difference in width between constriction portions 70 and 71.

In the sixth embodiment, when case 1 is divided into two along line 65 which is in parallel to a direction of depth of first recess 15 and passes through the center of first recess 15, two regions 66 and 67 of case 1 resulting from division into two are different from each other in deformability, and portion 12e located away is located to correspond to a region of the two regions which is more likely to deform. In the example shown in the sixth embodiment, region 66 is more likely to deform than region 67. Portion 12e located away is located to correspond to region 66. By adopting this construction, the portion located away is located to correspond to a region which is more likely to deform. Therefore, a probability of break of panel 2 due to a load applied to panel 2 by a deformed portion of case 1 when shock due to drop is applied to the electronic device can effectively be lowered.

In the sixth embodiment, by way of example, region 66 is more likely to deform than region 67 due to a difference in width between constriction portions 70 and 71. Actually, however, which of two regions 66 and 67 is more likely to deform is not necessarily determined simply as such. Not only a width of the constriction portion but also the number of constriction portions or a shape of the constriction portion may affect deformability of a region. The number of opening portions, a size of an opening portion, or positional relation of opening portions may also affect deformability of a region. A type of a material included in each region, a thickness of a member, or a cross-sectional shape may also affect deformability of each region. Deformability is determined with all factors being considered.

As shown in FIG. 26, in the sixth embodiment, panel 2 has a third side surface 23 located along second oblique side 17b. As shown in FIG. 35, case 1 includes a third site 77 opposed to third side surface 23. A portion of case 1 in the vicinity of first oblique side 17a is more likely to deform than a portion in the vicinity of second oblique side 17b. The portion of case 1 in the vicinity of first oblique side 17a refers to region 66 shown in FIG. 37. The portion of case 1 in the vicinity of second oblique side 17b refers to region 67 shown in FIG. 37. A length between first side surface 21 and first site 75 is longer than a length between third side surface 23 and third site 77. By adopting this construction, a distance between a side surface of panel 2 and a part of case 1 is longer in order to correspond to a deformable region. Therefore, a probability of break of panel 2 due to a load applied to panel 2 by a deformed portion of case 1 when shock due to drop is applied to the electronic device can effectively be lowered.

Though each embodiment shows an example in which a first recess is located only at a single location of a panel, the first recess may be located at a plurality of locations of the panel. Though an example in which a panel is transparent has mainly been described in each embodiment, the panel is not limited to a transparent plate member and it may be an opaque plate. For example, the panel may be a design panel affecting appearance of an electronic device.

Some features in embodiments above may be adopted as being combined as appropriate.

Though description has been given so far by using the term "electronic device," the electronic device is a broad concept covering, for example, a portable telephone, a portable information terminal, a tablet terminal, a personal computer, a game console, a television receiver, a portable music player, a CD player, a DVD player, an electronic calculator, an electronic organizer, an electronic dictionary, an electronic book reader, a digital camera, a video camera, a radio receiver, a navigation system, and a measurement instrument. The concept of the portable telephone or the portable information terminal includes a smartphone.

Though embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

The invention claimed is:

1. An electronic device comprising:
   a case;
   a panel which includes a first surface and a first recess, and is held by the case such that the first surface faces outward, wherein the first recess includes a first oblique side and a second oblique side, and the first oblique side and the second oblique side form such a tapered shape that the first recess is smaller in width toward a bottom of the first recess
   a first component located in the case; and
   a cover including a through hole or a cut for communication between the first component and outside, and located to hide the first recess.

2. The electronic device according to claim 1, wherein the first component comprises an acoustic component.

3. The electronic device according to claim 2, wherein the first component includes a breathable film located between the acoustic component and the cover.

4. The electronic device according to claim 3, wherein the breathable film comprises a waterproof breathable film.

5. The electronic device according to claim 2, wherein the acoustic component comprises at least any of a receiver, a microphone, and a speaker.

6. The electronic device according to claim 1, wherein the panel comprises a screen panel.

7. The electronic device according to claim 1, wherein the panel is mainly composed of sapphire.

8. The electronic device according to claim 1, wherein the cover is mainly composed of a resin.

9. The electronic device according to claim 1, wherein the panel includes a first side surface located along the first oblique side and a second side surface located along any portion other than the first recess, the case includes a first site opposed to the first side surface and a second site opposed to the second side surface, and a length between the first side surface and the first site is longer than a length between the second side surface and the second site.

10. The electronic device according to claim 9, wherein the panel includes a third side surface located along the second oblique side, the case includes a third site opposed to the third side surface, a portion of the case near the first oblique side is more likely to deform than a portion near the second oblique side, and the length between the first side surface and the first site is longer than a length between the third side surface and the third site.

11. An electronic device comprising:
    a case including a first housing component and a second housing component,
    a panel which includes a first surface and a first recess, and is held by the case such that the first surface faces outward,
    a first component located in the case; and
    a cover including a through hole or a cut for communication between the first component and outside, and located to hide the first recess, wherein the cover includes a first portion engaged with the first housing component, and the cover is fixed as the second housing component is combined with the case while the cover is engaged with the first housing component by the first portion.

12. The electronic device according to claim 11, wherein the first portion includes such a structure that the cover is fitted to the first housing component as the cover is slid in a direction in parallel to the first surface, and the second housing component is combined with the first housing component so as to cover at least a part of the first portion.

13. An electronic device comprising:
    a case;
    a panel which includes a first surface and a first recess, and is held by the case such that the first surface faces outward, wherein the panel includes a first section where the first recess is located and a second section which continues to the first section and projects relative to the first section, and a second component is located in the case so as to be superimposed on the panel in the second section
    a first component located in the case; and
    a cover including a through hole or a cut for communication between the first component and outside, and located to hide the first recess.

14. An electronic device comprising:
    a case;
    a panel which includes a first surface and a first recess, and is held by the case such that the first surface faces outward, wherein the panel includes a first side surface located along at least a part of the first recess and a second side surface located along any portion other than the first recess, the case includes a first site opposed to the first side surface and a second site opposed to the second side surface, and a length between the first side surface and the first site is longer than a length between the second side surface and the second site
    a first component located in the case; and
    a cover including a through hole or a cut for communication between the first component and outside, and located to hide the first recess.

* * * * *